United States Patent
Gill et al.

(10) Patent No.: US 6,728,055 B1
(45) Date of Patent: Apr. 27, 2004

(54) METHOD AND APPARATUS FOR PERFORMING SPIN VALVE COMBINED PINNED LAYER RESET AND HARD BIAS INITIALIZATION AT THE HGA LEVEL

(75) Inventors: Hardayal Singh Gill, Portola Valley, CA (US); Christopher Dana Keener, San Jose, CA (US); Gautam Ratilal Patel, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,618

(22) Filed: Mar. 21, 2000

(51) Int. Cl.⁷ .................................................. G11B 5/03
(52) U.S. Cl. ....................... 360/66; 360/324.1
(58) Field of Search .................... 360/66, 324.1; 29/603.08

(56) References Cited

U.S. PATENT DOCUMENTS

| | | |
|---|---|---|
| 4,785,366 A | 11/1988 | Krounbi et al. |
| 5,027,243 A | 6/1991 | Gill et al. |
| 5,264,980 A | 11/1993 | Mowry et al. |
| 5,576,908 A | 11/1996 | Garfunkel et al. |
| 5,650,887 A | 7/1997 | Dovek et al. |
| 5,664,319 A * | 9/1997 | Abboud et al. ........... 29/603.08 |
| 5,772,794 A * | 6/1998 | Uno et al. ................ 29/603.08 |
| 5,783,981 A | 7/1998 | Abboud et al. |
| 5,974,657 A | 11/1999 | Fox et al. |
| 6,181,492 B1 * | 1/2001 | Bonyhard ..................... 360/66 |
| 6,194,896 B1 * | 2/2001 | Takahashi et al. ........ 360/324.1 |

FOREIGN PATENT DOCUMENTS

| | | |
|---|---|---|
| JP | 10-222815 | 8/1998 |
| JP | 10-223942 | 8/1998 |
| JP | 10-241124 | 9/1998 |
| JP | 11-083967 | 3/1999 |
| JP | 11-086228 | 3/1999 |
| JP | 11-096516 | 4/1999 |
| JP | 11-195210 | 7/1999 |

* cited by examiner

Primary Examiner—David Hudspeth
Assistant Examiner—Rocio Colon
(74) Attorney, Agent, or Firm—Crawford Maunu PLLC

(57) ABSTRACT

The present invention provides a method and apparatus for performing automated spin valve combined pinned layer reset and hard bias initialization at the head gimbal assembly level. The reset combines a current pulse with an assisting magnetic field. The pinned layer reset and hard bias initialization is automated and performed by a single tool at the head gimbal assembly level to increase manufacturing throughput.

30 Claims, 8 Drawing Sheets

METHOD AND APPARATUS FOR PERFORMING SPIN VALVE COMBINED PINNED LAYER RESET AND HARD BIAS INITIALIZATION AT THE HGA LEVEL

BACKGROUND OF THE INVENTION

1. Field of the Invention

This invention relates in general to giant magnetoresistive (GMR) heads, and more particularly to a method and apparatus for performing spin valve combined pinned layer reset and hard bias initialization at the HGA level.

2. Description of Related Art

An MR sensor detects magnetic field signals through the resistance changes of a magnetoresistive element, fabricated of a magnetic material, as a function of the strength and direction of magnetic flux being sensed by the element. The conventional MR sensor operates on the basis of the anisotropic magnetoresistive (AMR) effect in which a component of the element resistance varies as the square of the cosine of the angle between the magnetization in the element and the direction of sense or bias current flow through the element.

MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr or Co/Cu multilayers exhibiting strong antiferromagnetic coupling of the ferromagnetic layers, as well as in essentially uncoupled layered structures in which the magnetization orientation in one of the two ferromagnetic layers is fixed or pinned.

A particularly useful application of GMR is a sandwich structure comprising two essentially uncoupled ferromagnetic layers separated by a nonmagnetic metallic spacer layer in which the magnetization of one of the ferromagnetic layers is "pinned". The pinning may be achieved by depositing the ferromagnetic layer to be pinned onto an antiferromagnetic layer, such as an iron-manganese (Fe—Mn) layer, to create an interfacial exchange coupling between the two layers. The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which exchange anisotropy vanishes because the local anisotropy of the antiferromagnetic layer, which decreases with temperature, has become too small to anchor the antiferromagnetic spins to the crystallographic lattice. The unpinned or "free" ferromagnetic layer may also have the magnetization of its extensions (those portions of the free layer on either side of the central active sensing region) also fixed, but in a direction perpendicular to the magnetization of the pinned layer so that only the magnetization of the free-layer central active region is free to rotate in the presence of an external field. The magnetization in the free-layer extensions may be fixed by longitudinal hard biasing or exchange coupling to an antiferromagnetic layer. However, if exchange coupling is used the antiferromagnetic material is different from the antiferromagnetic material used to pin the pinned layer, and is typically nickel-manganese (Ni—Mn). This resulting structure is called a "spin valve" (SV) MR sensor. In a SV sensor only the free ferromagnetic layer is free to rotate in the presence of an external magnetic field. U.S. Pat. No. 5,159,513, assigned to IBM, discloses a SV sensor in which at least one of the ferromagnetic layers is of cobalt or a cobalt alloy, and in which the magnetizations of the two ferromagnetic layers are maintained substantially perpendicular to each other at zero externally applied magnetic field by exchange coupling of the pinned ferromagnetic layer to an antiferromagnetic layer. U.S. Pat. No. 5,206,590, also assigned to IBM, discloses a basic SV sensor wherein the free layer is a continuous film having a central active region and end regions. The end regions of the free layer are exchange biased by exchange coupling to one type of antiferromagnetic material, and the pinned layer is pinned by exchange coupling to a different type of antiferromagnetic material.

Preferably, the thickness of the spacer layer is less than the mean free path of conduction electrons through the sensor. With this arrangement, a portion of the conduction electrons is scattered by interfaces between the spacer layer and the pinned and free layers. When the magnetizations of the pinned and free layers are substantially parallel, scattering is minimal and the electrical resistance of the sensor is at a minimum. When the magnetizations of the pinned and free layers are substantially antiparallel, scattering is maximized and the electrical resistance of the sensor is at a maximum. Changes in scattering alter the electrical resistance of the spin valve sensor in proportion to $\sin \theta$, where $\theta$ is the angle between the magnetizations of the pinned and free layers. A spin valve sensor is characterized by a magnetoresistive (MR) coefficient (the ratio of the change in electrical resistance of the sensor to its maximum electrical resistance) that is substantially higher than the MR coefficient of an anisotropic magnetoresistive (AMR) sensor. For this reason a spin valve sensor is sometimes referred to as a "giant magnetoresistive" (GMR) sensor.

The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes.

SV sensors are a replacement for conventional MR sensors based on the AMR effect. They have special potential for use as external magnetic field sensors, such as in anti-lock braking systems, and as read heads in magnetic recording systems, such as in rigid disk drives.

A read head employing a spin valve sensor (hereinafter, a "spin valve read head") may be combined with an inductive write head to form a combined magnetic head. In a magnetic disk drive, an air bearing surface (ABS) of a combined magnetic head is supported adjacent a rotating disk to write information on or read information from the disk. Information is written to the rotating disk by magnetic fields which fringe across a gap between the first and second pole pieces of the write head. In a read mode, the electrical resistance of the spin valve sensor changes proportionally to the magnitudes of the magnetic fields on the rotating disk. When a sense current $I_s$ is conducted through the spin valve sensor, electrical resistance changes cause potential changes that are detected and processed as playback signals.

Another type of spin valve sensor, an antiparallel (AP) pinned spin valve sensor, is described in commonly assigned U.S. Pat. No. 5,465,185 to Heim and Parkin, which is incorporated into this application by this reference. The AP pinned spin valve sensor differs from the pinned layer spin valve sensor, described above, in that the pinned layer of the AP pinned spin valve sensor comprises multiple thin films, which are collectively referred to as an antiparallel (AP) pinned layer, while the pinned layer of the pinned layer spin valve sensor is a single thin film layer. The AP pinned layer has a nonmagnetic spacer film, hereinafter referred to as an antiparallel (AP) coupling film, sandwiched between first and second ferromagnetic thin films. The first thin film is exchange coupled to the pinning layer by being immediately adjacent thereto, and has its magnetic moment directed in a first direction. The second thin film is immediately adjacent to the free layer and is exchange coupled to the first thin film by the minimal thickness (in the order of 5 .ANG.) of the AP coupling film between the first and second thin films. The magnetic moment of the second thin film is oriented in a second direction that is antiparallel to the direction of the magnetic moment of the first film. The magnetic moments of the first and second films subtractively combine to provide a net pinning moment of the pinned layer. The direction of the net moment is determined by the thicker of the first and second thin films. The thicknesses of the first and second thin films are chosen to reduce the net moment. A reduced net moment results in a reduced demagnetization (demag) field from the AP pinned layer. Since the exchange coupling between the pinning layer and first thin film is inversely proportional to the net pinning moment, the exchange coupling is increased.

A transfer curve (a plot of the readback signal of the spin valve head versus the applied signal from the magnetic disk) of a spin valve sensor is defined by sin θ. A substantially flat portion of the transfer curve is selected for location of a bias point so that response of the sensor is substantially linear. Since positive and negative magnetic fields from a moving magnetic disk are typically equal in magnitude, it is important that positive and negative changes in the magnetoresistance of the spin valve sensor about the bias point on the transfer curve also be equal, which is referred to herein as read signal symmetry. The location of the bias point on the transfer curve is influenced by various magnetic fields when the sensor is in a quiescent state (sense current conducted, but an absence of magnetic fields from the rotating disk). When these magnetic fields are not balanced there will be read signal asymmetry in a positive or a negative direction with respect to the bias point.

A high performance spin valve head has high magnitude read signal output, and low, or no, read signal asymmetry. Where there is no read signal asymmetry, the transfer curve of the read signal is centered about a zero bias point. This means that from a point where the input signal is zero, the amplitudes of the positive and negative read signal outputs are equal as the input signals go between positive to negative levels. The level of performance of the spin valve head is dependent upon proper orientation and magnetizations of the aforementioned layers. If either of the pinned or biasing layers acquires a multi-magnetic domain state, read signal output will be decreased and read signal asymmetry will be increased. The impact on read signal output and read signal asymmetry will be even greater if the magnetic spins of the pinning layer are disoriented.

Furthermore, the SV sensor, which is typically fabricated by depositing an antiferromagnetic layer of Fe—Mn onto the ferromagnetic pinned layer of cobalt (Co) or permalloy (Ni—Fe), suffers from the problem that the range of blocking temperature for this interface is relatively low, i.e., it extends only from approximately 130° C. to approximately 160° C. These temperatures can be reached by certain thermal effects during operation of the disk drive, such as an increase in the ambient temperature inside the drive, heating of the SV sensor due to the bias current, and rapid heating of the SV sensor due to the head carrier contacting asperities on the disk. In addition, during assembly of the disk drive the SV sensor can be heated by current resulting from an electrostatic discharge. If any of these thermal effects cause the SV sensor to exceed the antiferromagnet's blocking temperature the magnetization of the pinned layer will no longer be pinned in the desired direction. This will lead to a change in the SV sensor's response to an externally applied magnetic field, and thus to errors in data read back from the disk.

U.S. Pat. No. 5,650,887, commonly assigned to IBM, discloses a recovery system and process to reset the magnetization of the SV sensor's pinned layer to the desired orientation. A pinned layer magnetization reset system is incorporated into systems that use SV sensors. The reset system generates an electrical current waveform that is directed through the SV sensor with an initial current value sufficient to heat the antiferromagnetic layer above its blocking temperature, and a subsequent lower current value to generate a magnetic field around the pinned layer sufficient to properly orient the magnetization of the pinned layer while the antiferromagnetic layer is cooling below its blocking temperature. This process resets the magnetization of the pinned layer to its preferred orientation and returns the SV sensor response substantially back to its desired state. However, U.S. Pat. No. 5,650,887 only resets the pinned layer.

U.S. Pat. No. 5,974,657 discloses a system for resetting of the magnetization of the hard biasing layer and the antiferromagnetic pinning layer at the row level. The antiferromagnetic pinning layer is reset by heating the pinning layer with a current pulse conducted through the leads to the conductive layers of the spin valve head so that localized heating takes place adjacent the pinning layer as contrasted to ambient heating of the spin valve head. Simultaneous with the localized heating the first magnetic field is applied for orienting the magnetic spins of the pinning layer perpendicular to the ABS and resetting the magnetic moment of the pinned layer perpendicular to the ABS in a single domain state. Subsequently, a second magnetic field is applied for resetting the magnetic moment of the hard biasing layer parallel to the ABS in a single domain state. However, U.S. Pat. No. 5,974,657 does not disclose a system that will automatically perform a process for resetting the pinned layer and the hard bias layer at the head gimbal assembly (HGA) level.

It can be seen that there is a need for a method and apparatus for performing automated spin valve combined pinned layer reset and hard bias initialization at the HGA level.

SUMMARY OF THE INVENTION

To overcome the limitations in the prior art described above, and to overcome other limitations that will become apparent upon reading and understanding the present specification, the present invention discloses a method and apparatus for performing spin valve combined pinned layer reset and hard bias initialization at the HGA level.

The present invention solves the above-described problems by combining a current pulse with an assisting magnetic field. The pinned layer reset and hard bias initialization is automated and performed by a single tool at the head gimbal assembly level to increase manufacturing throughput. The process may be automatically performed in response to a single user action.

A method and article of manufacture in accordance with the principles of the present invention includes initiating an automated process in response to a single user action, the process including first resetting the pinned layer of the spin valve sensor by loading a head gimbal assembly in a first orientation and applying a current pulse and a first assisting magnetic field of a magnet to the spin valve sensor and then reinitializing the hard bias layer of the spin valve sensor by rotating the head gimbal assembly 90 degrees to a second orientation and applying a second magnetic field of the magnet.

Other embodiments of a method and article of manufacture in accordance with the principles of the invention may include alternative or optional additional aspects. One such aspect of the present invention is that the resetting the pinned layer further comprises connecting the spin valve sensor to a pulse generator, positioning the head gimbal assembly in a first orientation within poles of a magnet, applying a current pulse to the spin valve sensor, turning on the magnet to produce a magnetic field for resetting the pinned layer of the spin valve sensor, turning the magnetic field of the magnet off and removing the head gimbal assembly from the magnet.

Another aspect of the present invention is that the reinitializing the hard bias layer further comprises rotating the head gimbal assembly 90 degrees to a second orientation, re-inserting the head gimbal assembly between the poles of the magnet, turning magnet on to reinitialize the hard bias layer of the spin valve sensor, turning the magnet off and removing the head gimbal assembly from the magnet poles of the magnet.

Another aspect of the present invention is that the first orientation aligns the pinned layer magnetization with the first assisting magnetic field of the magnet.

Another aspect of the present invention is that the second orientation aligns the hard bias layer magnetization with the second magnetic field of the magnet.

Another aspect of the present invention is that the magnetic field is 6500 Oersted.

Another aspect of the present invention is that the current pulse includes an adjustable current level.

Another embodiment of the present invention includes a system for performing automated spin valve combined pinned layer reset and hard bias initialization at the head gimbal assembly level. The system includes a motion controller for holding and controlling the motion of a head gimbal assembly having a spin valve sensor relative to a magnet, a pulse generator for applying a current pulse to the spin valve sensor and a processor, coupled to the motion controller, the pulse generator and the magnet, the processor in response to a user action controlling the motion controller to position of the head gimbal assembly, controlling the application of the current pulse to the spin valve sensor and controlling the application of a magnetic field of the magnet. The processor first resets the pinned layer of the spin valve sensor by loading the head gimbal assembly in a first orientation within the poles of the magnet and applying a current pulse from the pulse generator and a first assisting magnetic field of the magnet to the spin valve sensor and then reinitializes the hard bias layer of the spin valve sensor by rotating the head gimbal assembly 90 degrees to a second orientation and applying a second magnetic field of the magnet.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for performing automated spin valve combined pinned layer reset and hard bias initialization at the HGA level. The reset combines a current pulse with an assisting magnetic field. The pinned layer reset and hard bias initialization is automated and performed by a single tool at the head gimbal assembly level to increase manufacturing throughput.

Figure 1:
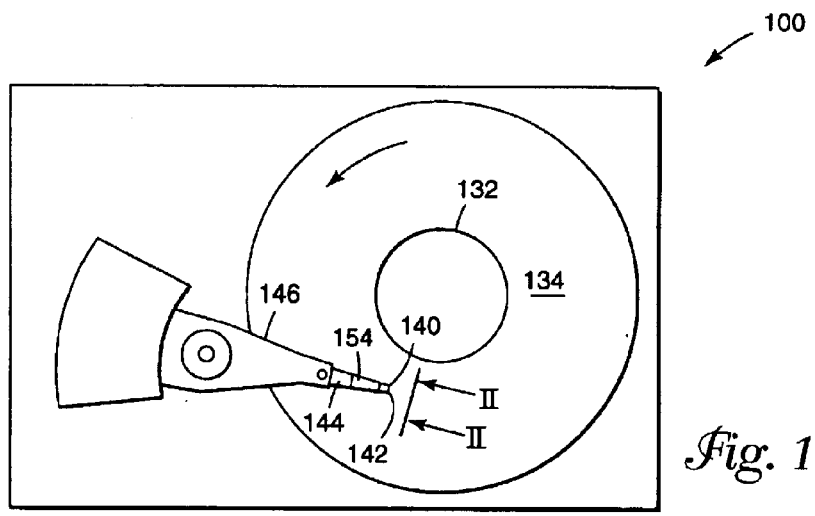
FIG. 1 is a planar view of a magnetic disk drive.

FIG. 1 illustrates a magnetic ("hard") disk drive 100. The drive 100 includes a spindle 132 that supports and rotates a magnetic disk 134. A combined read and write magnetic head 140 is mounted on a slider 142 that is supported by a suspension 144 and actuator arm 146. The suspension 144 and actuator arm 146 position the slider 142 so that the magnetic head 140 is in a transducing relationship with a surface of the magnetic disk 134. The components described hereinabove may be mounted on a frame 154.

Figure 2:
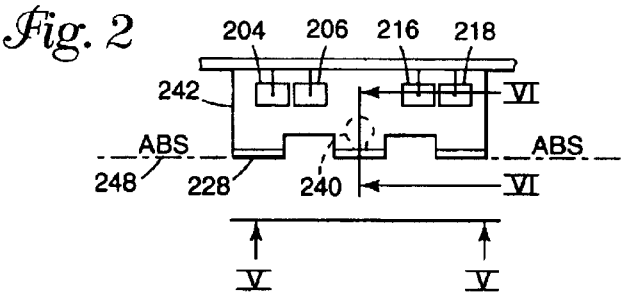
FIG. 2 is an end view of a slider with a magnetic head as seen in plane II—II.

FIG. 2 is an end view of a slider 242 with a magnetic head as seen in plane II—II. In FIG. 2, first and second solder connections 204 and 206 connect leads from the spin valve sensor 240, and third and fourth solder connections 216 and 218 connect leads from the coil (see FIG. 8). A wear layer 228 may be employed for protecting sensitive elements of the magnetic head. When the disk is rotated the slider 242 is supported on a thin (typically, 0.05 $\mu$m) cushion of air (air bearing) between the surface of the disk and the air bearing surface (ABS) 248. The magnetic head 240 may then be employed for writing information signals to multiple circular tracks (not shown) on the surface of the disk, as well as for reading information signals therefrom.

Figure 3:
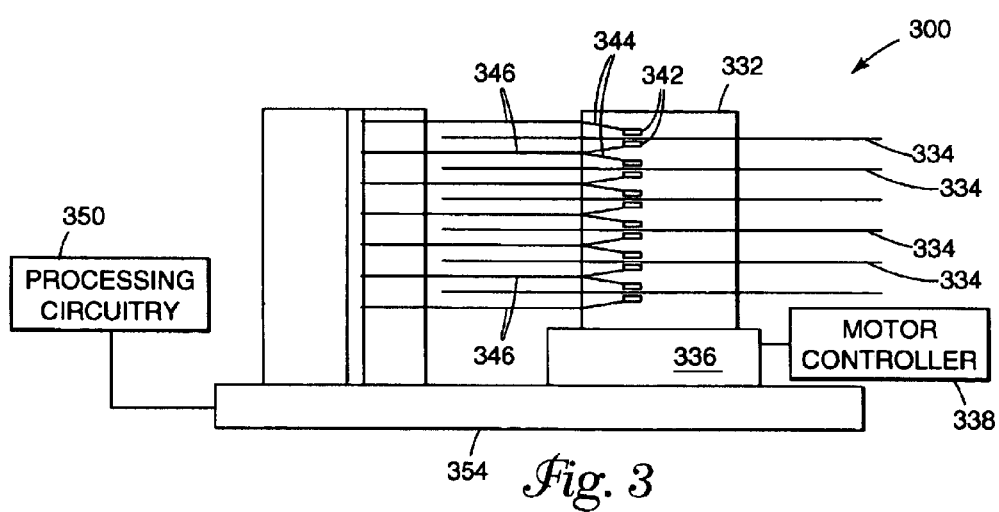
FIG. 3 is an elevation view of the magnetic disk drive wherein multiple disks and magnetic heads are employed.

FIG. 3 illustrates side view 300 of a disk drive having a plurality of disks, sliders and suspensions as may be employed in a large capacity direct access storage device (DASD). The spindle 332 is rotated by a motor 336 that is controlled by a motor controller 338. Processing circuitry 350 exchanges information signals with the head on slider 342, provides motor drive signals for rotating the magnetic disk 334, and provides control signals for moving the slider to various tracks. Slider 342 that is supported by a suspension 344 and actuator arm 346.

Figure 4:
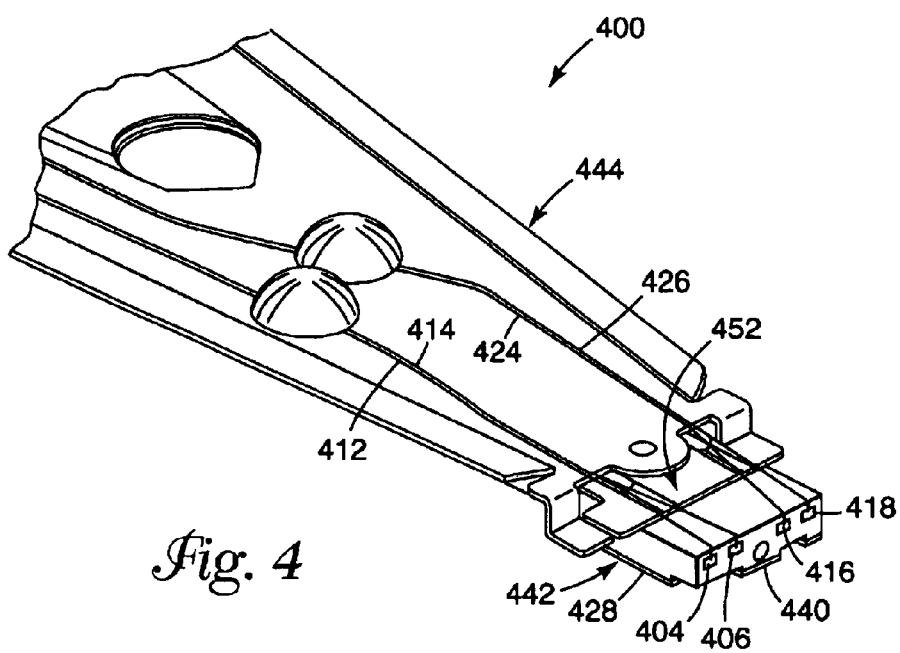
FIG. 4 is an isometric illustration of an exemplary suspension system for supporting the slider and magnetic head.

FIG. 4 is an isometric illustration of an exemplary suspension system 400 for supporting the slider and magnetic head. In FIG. 4 the slider 442 is shown mounted to a head gimbal assembly (HGA) 452 which, in turn, is mounted to the suspension 444. First and second solder connections 404 and 406 connect leads from the spin valve sensor 440 to leads 412 and 414 on the suspension 44, and third and fourth solder connections 416 and 418 connect leads from the coil (see FIG. 8) to leads 424 and 426 on the suspension. A wear layer 428 may be employed for protecting sensitive elements of the magnetic head.

Figure 5:
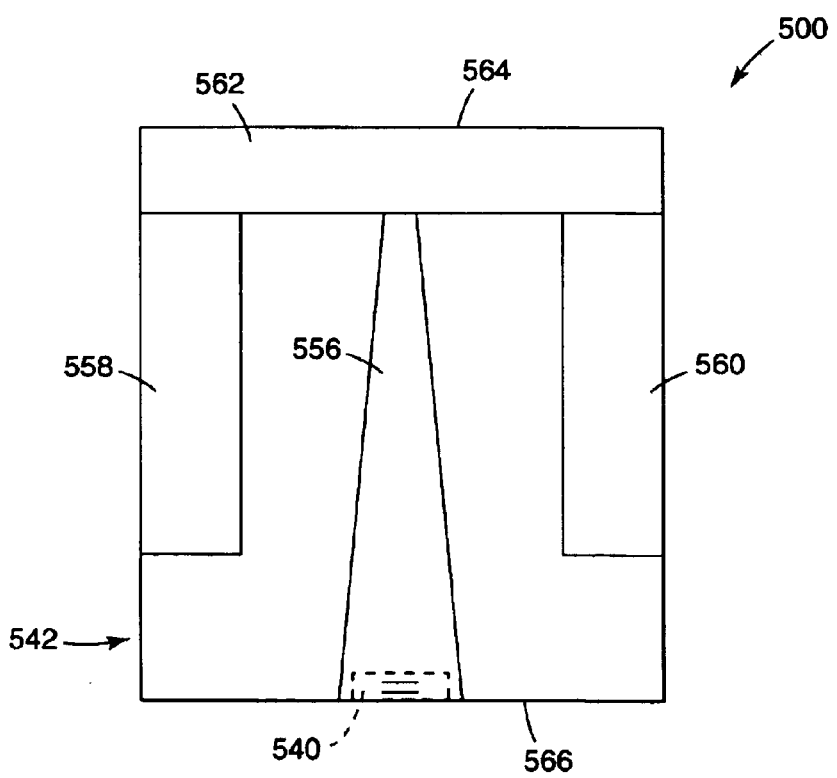
FIG. 5 is an ABS view of the magnetic head taken along in plane V—V of FIG. 2.

FIG. 5 is an ABS view 500 of the slider 542 and the magnetic head 540. The slider 542 may have a center rail 456 that'supports the magnetic head 540, and side rails 558 and 560. The rails 556, 558 and 560 extend from a cross rail 562. With respect to the direction of rotation of the magnetic disk, the cross rail 562 is at a leading edge 564 of the slider 542 and the magnetic head 540 is at a trailing edge 566 of the slider.

Figure 6:
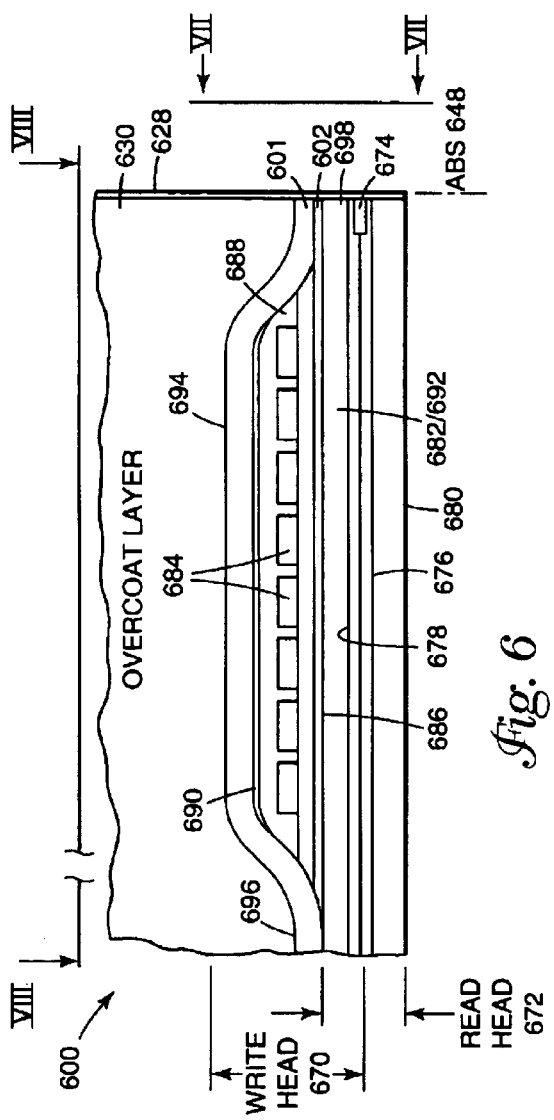
FIG. 6 is a partial view of the slider and magnetic head as seen in plane VI—VI of FIG. 2.

FIG. 6 is a side cross-sectional elevation view of the merged MR head 600, which includes a write head portion 670 and a read head portion 672, the read head portion 672 employing an AP pinned spin valve sensor 674 of the present invention.

The spin valve sensor 674 is sandwiched between first and second gap layers 676 and 678, and the gap layers are sandwiched between first and second shield layers 680 and 682. In response to external magnetic fields (information signals), the resistance of the spin valve sensor 674 changes. A sense current $I_s$ conducted through the sensor causes these resistance changes to be manifested as potential changes. These potential changes are then processed as readback signals by the processing circuitry 350 shown in FIG. 3.

The write head portion 670 of the merged MR head includes a coil layer 684 sandwiched between first and second insulation layers 686 and 688. A third insulation layer 690 may be employed for planarizing the head to eliminate ripples in the second insulation layer caused by the coil layer 684. The first, second and third insulation layers are referred to in the art as an "insulation stack". The coil layer 684 and the first, second and third insulation layers 686, 688 and 690 are sandwiched between first and second pole piece layers 692 and 694. The first and second pole piece layers 692 and 694 are magnetically coupled at a back gap 696 and have first and second pole tips 698 and 601 which are separated by a write gap layer 602 at the ABS 648. An overcoat layer 630 of alumina ($Al_2O_3$) covers the aforementioned layers of the head. A wear layer 628 may be employed for protecting sensitive elements of the magnetic head.

Figure 7:
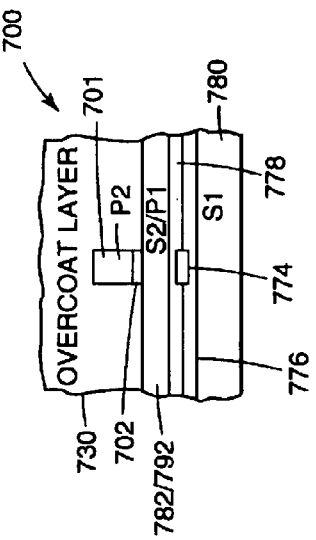
FIG. 7 is a partial ABS view of the slider taken along plane VII—VII of FIG. 6 to show the read and write elements of the magnetic head.

FIG. 7 is a partial ABS view of the slider 700 taken along plane VII—VII of FIG. 6 to show the read and write elements of the magnetic head. As described above with reference to FIG. 6, the spin valve sensor 774 is sandwiched between first and second gap layers 776 and 778, and the gap layers are sandwiched between first and second shield layers 780 and 782. In response to external magnetic fields (information signals), the resistance of the spin valve sensor 774 changes. The first and second pole piece layers 792 and 701 are separated by a write gap layer 702 at the ABS. The overcoat layer 630 covers the aforementioned layers of the head.

Figure 8:
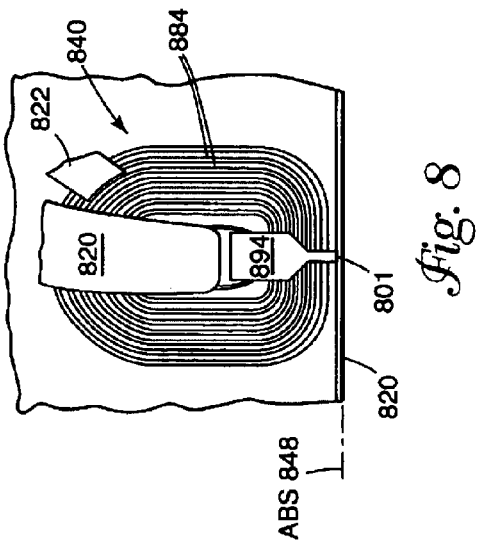
FIG. 8 is a view taken along plane VIII—VIII of FIG. 6 with all material above the write coil removed except for write coil leads of the second pole piece.

FIG. 8 is a view taken along plane VIII—VIII of FIG. 6 with all material above the write coil removed except for write coil leads of the second pole piece. The write head portion of the merged MR head includes a coil layer 884. Leads 820 and 822 are shown attached to the coil 884. The coil layer 884 is shown below the second pole piece layer 894 and second pole tip 801. Lead 820 is connect to the leads on the suspension. The slider is supported on a cushion of air (between the surface of the disk (not shown) and the air bearing surface (ABS) 848.

Figure 9:
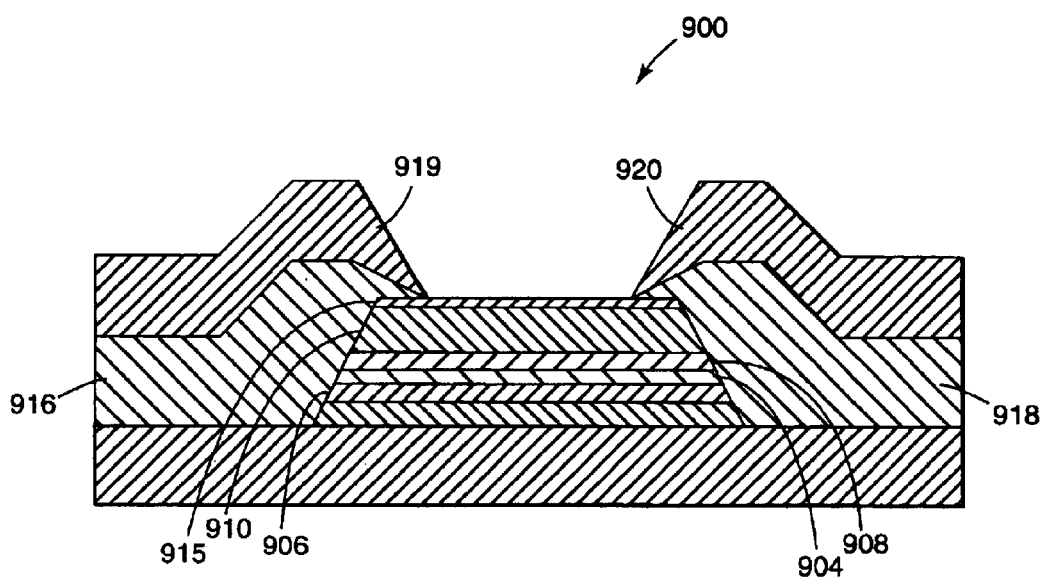
FIG. 9 is an ABS view of a single film pinned layer spin valve sensor.

FIG. 9 is an view of a single film pinned layer spin valve sensor 900. The spin valve sensor 900 includes a nonmagnetic electrically conductive spacer layer 904 sandwiched between a ferromagnetic free layer 906 and a ferromagnetic pinned layer 908. An antiferromagnetic (AFM) pinning layer 910 interfacially engages the pinned layer 908. The magnetic spins of the pinning layer 910 (out of the drawing), by exchange coupling, cause the magnetic moment of the pinned layer 908 to be directed into the drawing and toward the ABS. Optionally, the magnetic spins of the pinning layer 910 may be oriented into the drawing. The free layer 206 has a magnetic moment 214 directed generally parallel to the ABS. The free layer 906 is typically capped with an electrically conductive capping layer 915, such as tantalum. A tantalum seed layer 930 may be used to cap the free layer 906.

Hard biasing layers 916 and 918 are exchange coupled to opposite end portions of the free layer 906 for stabilizing the free layer 906 in a single domain state. Electrically conductive leads 919 and 920 are electrically connected to opposite end portions of the sensor 900, the distance between the connections of the leads to the sensor defining the track width of the sensor. In a magnetic disk drive, as shown in FIG. 3, processing circuitry 350 applies a sense current $I_s$ through the sensor from left to right, as shown in FIG. 9. When the sensor 900 is subjected to magnetic fields from a rotating magnetic disk, the fields rotate the moment of the free layer 906 causing its angular position with respect to the fixed (pinned) moment of the pinned layer 908 to change upwardly and downwardly, depending upon the polarity of the field signals from a rotating magnetic disk. This causes corresponding resistance changes in the sensor which, in turn, causes potential changes across the sensor which are detected by a sensing circuit in the processing circuitry 350 as readback signals.

Before a magnetic head is mounted on the suspension and connected to the ESD protection circuits (not shown), the sensor 900 of the head may have been subjected to an ESD that disorients the magnetic spins of the antiferromagnetic layer 910 and destabilizes a single domain state of the pinned and biasing layers 908, 916 and 918. This may not be known until the magnetic head has been installed to form a head gimbal assembly. This equates to a significant amount of costly labor. Without some scheme for resetting the layers, a magnetic disk drive may become unmarketable.

Figure 10:
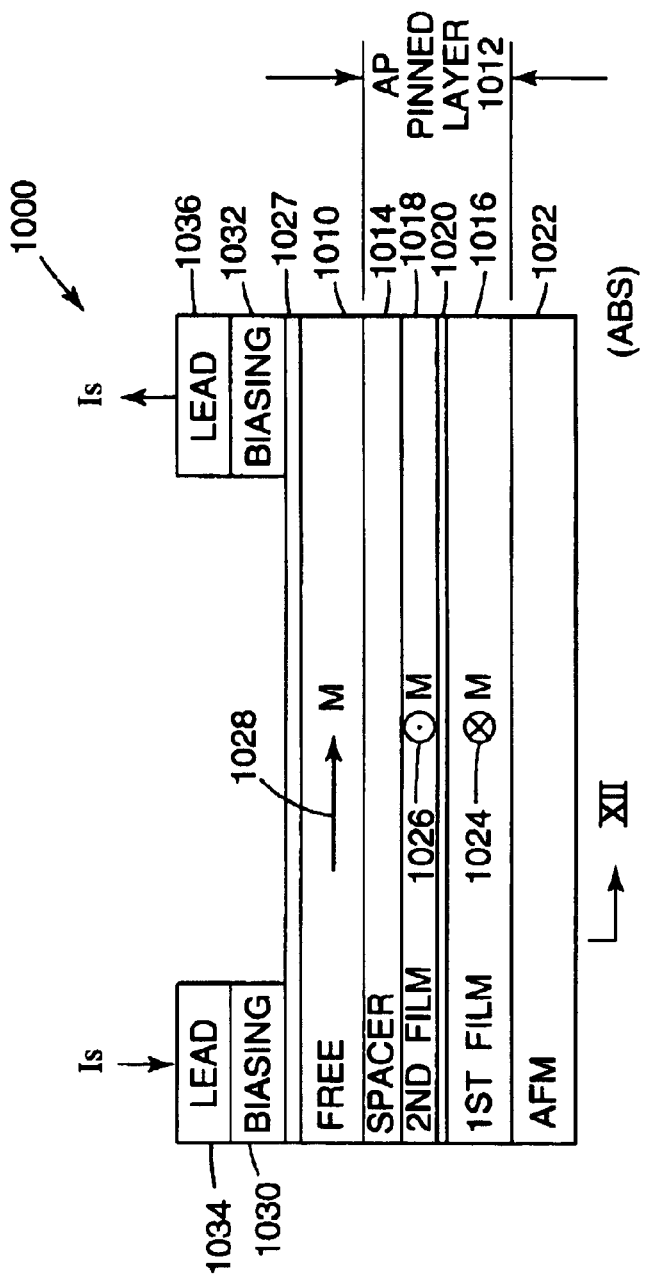
FIG. 10 is an ABS view of an antiparallel (AP) pinned spin valve sensor.

The sensor 1000 shown in FIG. 10 is an antiparallel (AP) pinned spin valve sensor. The sensor 1000 has a ferromagnetic free layer 1010, an antiparallel pinned ferromagnetic layer 1012, and a nonmagnetic electrically conductive spacer layer 1014. The spacer layer 1014 is sandwiched between the free layer 1010 and the pinned layer 1012. The AP pinned layer 1012 differs from the typical spin valve sensor, which employs a single film pinned layer, in that the AP pinned layer 1012 employs first and second ferromagnetic films 1016 and 1018 which are separated by a nonmagnetic electrically conductive spacer film 1020, which is referred to hereinafter as an antiparallel pinned (AP) coupling film 1020. The first film 1016 has a surface which interfaces with a surface of an antiferromagnetic pinning layer 1022 so that the pinning layer pins the magnetic moment 1024 of the first film by exchange coupling in a pinned direction perpendicular to and away from or toward the ABS. The AP coupling film 1020 is very thin, in the order of 8 Å, which allows an antiferromagnetic exchange coupling between the first and second films 1016 and 1018. Accordingly, the magnetic moment 1026 of the second film is directed in a direction opposite to the magnetic moment 1024 of the first film 1016, namely perpendicular to and toward the ABS. The thicker of the two films 1016 and 1018 determines the net magnetic moment of the AP pinned layer 1012. The first film 1016 has been selected to be the thicker of the two films so that the net magnetic moment is directed perpendicular to and away from the ABS. A capping layer 1027 may cover the free layer 1010.

The free layer 1010 has a magnetic moment 1028 which is free to rotate in first and second directions under the influence of field signals (flux incursions) from the rotating disk. These field signals are positive and negative going signals, typically of equal magnitude. First and second hard bias layers 1030 and 1032 are exchange coupled to end portions of the free layer 1010 for stabilizing the free layer in a single domain state. First and second leads 1034 and 1036 are electrically connected to end portions of the sensor 1000 with a space therebetween which defines the active region of the sensor as well as the trackwidth of the read head employing the sensor. In a magnetic disk drive, as shown in FIG. 3, processing circuitry 350 applies a sense current $I_s$ through the sensor as shown by the arrows in FIG. 10. The processing circuitry 350 senses potential changes across the sensor 1000 when field signals are induced in the sensor by the rotating disk 334 shown in FIG. 3.

Each of the layers 1010, 1014, 1016, 1018 and 1020 conducts a portion of the sense current between the first and second leads 1034 and 1036. As discussed hereinabove, an aspect of the spin valve sensor is limiting the spacer layer 1014 to a thickness less than the mean free path of conduction electrons flowing in the free and pinned layers 1010 and 1012. The degree of electron scattering, which depends upon the relative angle between the magnetization 1028 of the free layer 1010 and the magnetization 1026 of the second film 1018, determines the resistance of the sensor to the sense current $I_s$. The greatest scattering and the correspondingly greatest increase in resistance occurs when the magnetization 1028 of the free layer and the magnetization 1026 of the AP pinned layer are antiparallel, and the least scattering and the correspondingly least resistance change occurs when the magnetization 1028 of the free layer and the magnetization 1026 of the AP pinned layer are parallel with respect to one another.

The magnetization 1028 of the free layer 1010 is typically oriented substantially parallel to the ABS so that, upon receiving positive and negative field signals from a rotating disk, the magnetization 1028 rotates upwardly or downwardly to decrease or increase the resistance of the sensor. The opposite effect would be produced if the magnetization of the second film 1018 was oriented away from the ABS instead of toward the ABS. When the sense current is directed, as shown in FIG. 10, the bias point will be shifted relative to the transfer curve. This is caused by various magnetic influences on the free layer 1010.

Figure 11:
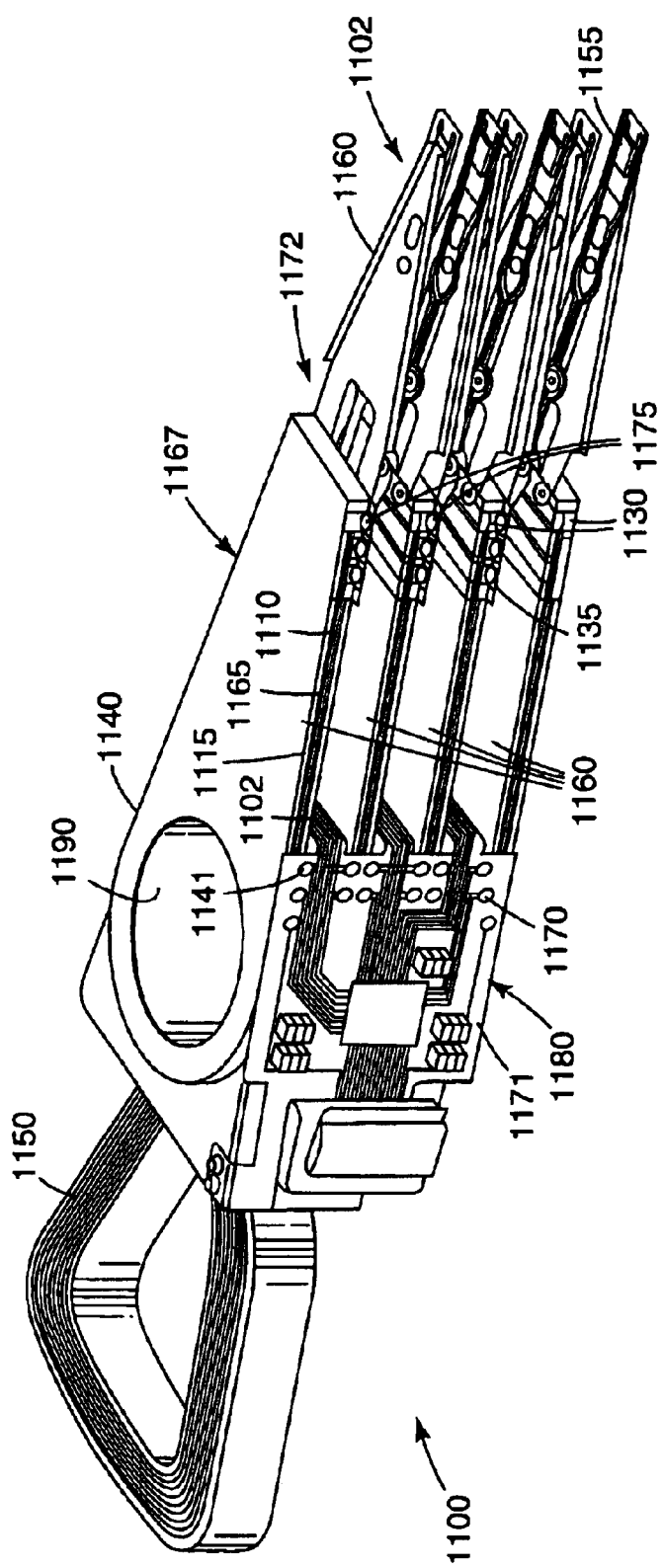
FIG. 11 is a perspective view of the head stack assembly (HSA) including a plurality of head gimbal assemblies (HGA)

FIG. 11 is a perspective view of the head stack assembly (HSA) 1100 including a plurality of head gimbal assemblies (HGA) 1102. A head stack assembly 1100 includes a body portion 1140, a main flex circuit 1171 including main flex conductive pads 1170 which mate with corresponding proximal conductive pads (generally indicated by 1141 in FIG. 11) of conductive traces, at least one actuator arm 1160 and a head gimbal assembly 1102. The body portion 1140 includes a bore 1190 defining a pivot axis. The body portion 1140 also defines a mounting site 1180 onto which the main flex circuit 1171 is mounted. Each of the actuator arms 1160 is cantilevered from the body portion 1140 and includes a first side surface 1165 and a second side surface 1167. The first side surface 1165 and the second side surface 1167 are substantially parallel to a pivot axis defined by the bore 1190 of the body portion 1140. For ease and uniformity of description, the proximal end of an actuator arm 1160 is defined as that end thereof which is closest to the bore 1190, whereas the distal end of an actuator arm 1160 is defined as that end thereof which is closest to the HGA 1102.

Conductive traces 1110 are supported at the first side surface 1165 of each of the actuator arms 1160 via a first actuator arm flex circuit 1115. The first array of conductive trace 1110 define vertical planes that are substantially parallel to the pivot axis defined by the bore 1190. The conductive trace of the first array of conductive traces 1110 includes a proximal conductive pad 1141 proximate to the proximal end of its respective actuator arm 1160. Similarly, the conductive traces of the first array of conductive traces 1110 includes a distal conductive pad 1130 proximate to the distal end of its respective actuator arm 1160. A conductive path is disposed between each corresponding proximate and distal conductive pad 1141.

As mentioned above, when the pinning, pinned and biasing layers of either the single pinned sensor 900, shown in FIG. 9, or the AP pinned sensor 1000, shown in FIG. 10, are destabilized during construction and/or processing signal amplitude of the head is decreased and read signal asymmetry is increased. In a spin valve recording head, the magnetization of the exchange-biased pinned layer may rotate upon the application of a current pulse which heats the sensor to a temperature greater than the blocking temperature of the antiferromagnetic material. This effect may be enhanced with the simultaneous application of a magnetic field along which the magnetic moment of the pinned layer aligns. Independently of the pinned layer, the free layer of the sensor is stabilized by the magnetic field of a hard bias material, which can be initialized in an externally applied magnetic field.

The present invention provides an automated system for resetting the pinned layer magnetization in the preferred direction by simultaneous application of magnetic field and a current pulse. The present invention also initializes the hard bias for the free layer.

Figure 12A:
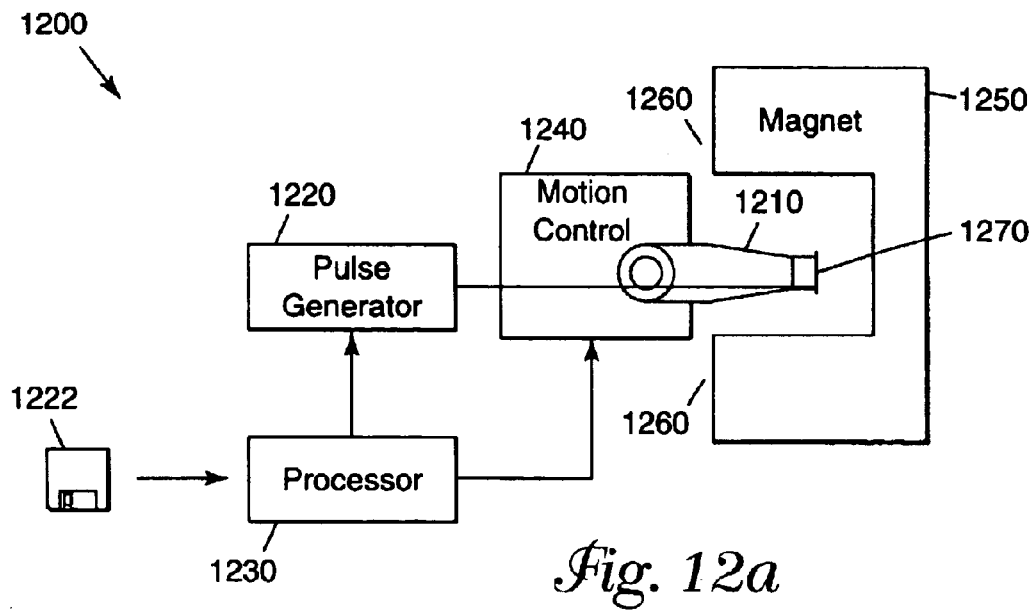
FIGS. 12a–b illustrate block diagrams of the system for performing automated spin valve combined pinned layer reset and hard bias initialization at the HGA level.
Figure 12B:
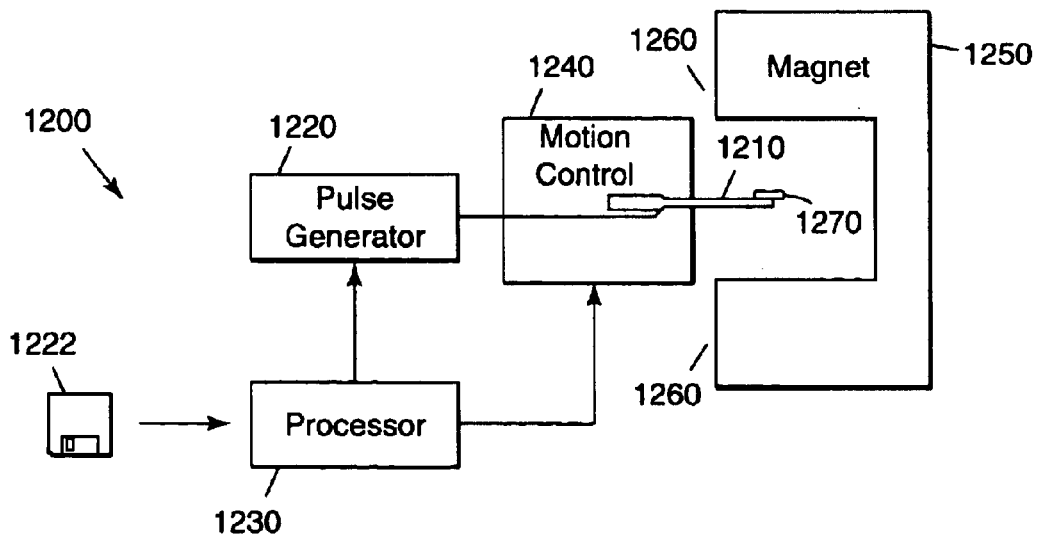

FIGS. 12a–b illustrate block diagrams of the system 1200 for performing automated spin valve combined pinned layer reset and hard bias initialization at the HGA level. FIG. 12a illustrates the HGA oriented in a first position for resetting the pinned layer. In FIG. 12a, an HGA 1210 is loaded into the system to make electrical contact to a pulse generator 1220. An operator initiates the system, which includes a processor 1230 that is configured by program storage medium 1222. The medium 1222 tangibly embodies one or more programs of instructions executable by the processor 1230 to perform the method described herein and with reference to FIG. 13 below. The processor 1230 controls the motion controller 1240, the pulse generator 1220 and the magnet 1250. The processor 1230 positions the HGA 1210 within the poles 1260 of the magnet 1250 in a first orientation for resetting the pinned layer.

The processor 1230 turns the magnetic field on (H=6.5 kOe) and applies a current pulse from the pulse generator 1220 to the read element of the spin valve sensor 1270. Then, the magnetic field of the magnet 1250 is turned off by the processor 1230. The processor 1230 removes the HGA 1210 from the magnet 1250. The pinned layer of the GMR 1270 is now reset.

FIG. 12b illustrates the HGA oriented in a second position for initializing the hard bias layer. The processor 1230 automatically rotates the HGA 1210 90 degrees. The processor 1230 re-inserts the HGA 1210 between the poles 1260 of the magnet 1250 as shown in FIG. 12b. The processor 1230 turns the magnet 1250 on and off again. Now, the hard bias of the spin valve sensor 1270 is also initialized. The processor 1230 then removes the HGA 1210 from the magnet poles of the magnet 1250 and returns the HGA to home.

All of the steps are performed automatically by the system 1200 after initialization of the process by a user. Thus, the system 1200 performs pinned layer reset at the HGA level by combining a current pulse with an assisting magnetic field and then initializes the hard bias layer after rotating the HGA 90 degrees. All of these operations are automated, so the operation can be performed quickly and efficiently with little operator input Oust initialization of the process).

Figure 13:
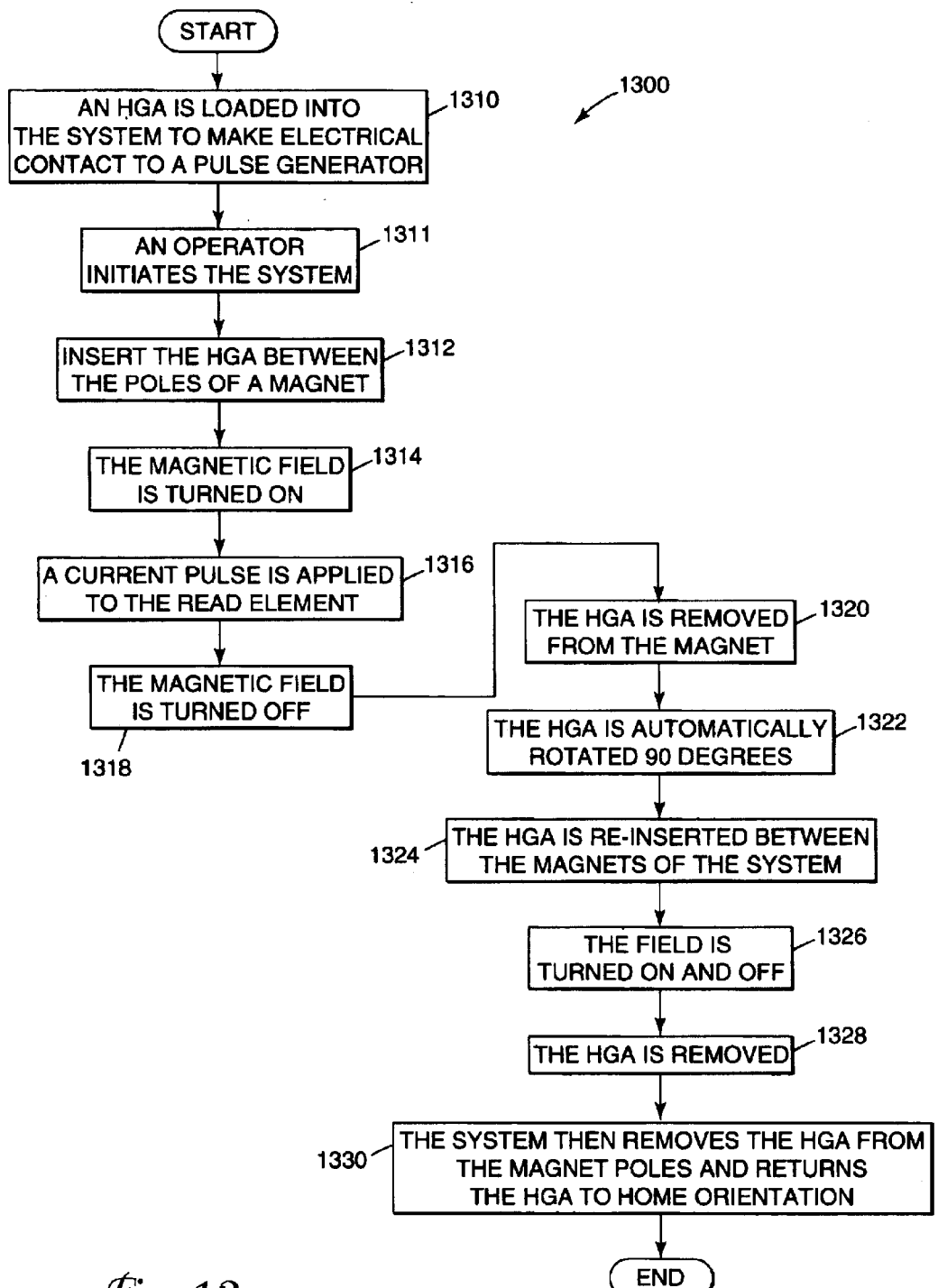
FIG. 13 illustrates a flow chart of the process for performing automated spin valve combined pinned layer reset and hard bias initialization at the HGA level.

FIG. 13 illustrates a flow chart 1300 of the process for performing automated spin valve combined pinned layer reset and hard bias initialization at the HGA level. First, an HGA is loaded into the system to make electrical contact to a pulse generator 1310. An operator initiates the system 1311, which is programmed to then insert the HGA between the poles of a magnet 1312. The magnetic field is turned on (H=6.5 kOe) 1314 and a current pulse is applied to the read element 1316. Then the magnetic field is turned off 1318 and the HGA is removed from the magnet 1320. The HGA is automatically rotated 90 degrees 1322 and the HGA is re-inserted between the magnets of the system 1324. The field is turned on and off again 1326, and the HGA is removed 1328. Now the pinned layer is reset and the hard bias is initialized at the HGA level. The system then removes the HGA from the magnet poles and returns the HGA to home orientation 1330.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing spin valve combined pinned layer reset and hard bias initialization at the head gimbal assembly level comprising initiating a process, the process including first resetting the pinned layer of the spin valve sensor by loading a head gimbal assembly in a first orientation and applying a first assisting magnetic field of a magnet to the spin valve sensor and then reinitializing the hard bias layer of the spin valve sensor by rotating the head gimbal assembly 90 degrees to a second orientation and applying a second magnetic field of the magnet.

2. The method of claim 1 wherein the initiated process is automatically performed in response to a single user action.

3. The method of claim 1 further comprising applying a current pulse to the spin valve sensor when the head gimbal assembly is loaded in the first orientation.

4. The method of claim 3 wherein the resetting the pinned layer further comprises:
   connecting the spin valve sensor to a pulse generator;
   positioning the head gimbal assembly in a first orientation within poles of a magnet;
   applying a current pulse to the spin valve sensor;
   turning on the magnet to produce a magnetic field for resetting the pinned layer of the spin valve sensor;
   turning the magnetic field of the magnet off; and
   removing the head gimbal assembly from the magnet.

5. The method of claim 4 wherein the reinitializing the hard bias layer further comprises:
   rotating the head gimbal assembly 90 degrees to a second orientation;
   re-inserting the head gimbal assembly between the poles of the magnet;
   turning magnet on to reinitialize the hard bias layer of the spin valve sensor;
   turning the magnet off; and
   removing the head gimbal assembly from the magnet poles of the magnet.

6. The method of claim 3 wherein the first orientation aligns the pinned layer magnetization with the first assisting magnetic field of the magnet.

7. The method of claim 3 wherein the second orientation aligns the hard bias layer magnetization with the second magnetic field of the magnet.

8. The method of claim 3 wherein the first assisting magnetic field is 6500 Oersted.

9. The method of claim 3 wherein the second magnetic field is 6500 Oersted.

10. The method of claim 3 wherein the current pulse includes an adjustable current level.

11. The method of claim 3 wherein the reinitializing the hard bias layer further comprises:
   rotating the head gimbal assembly 90 degrees to a second orientation;

re-inserting the head gimbal assembly between the poles of the magnet;

turning the magnet on to reinitialize the hard bias layer of the spin valve sensor;

turning the magnet off; and removing the head gimbal assembly from the magnet poles of the magnet.

12. The method of claim 3 wherein the initiated process is automatically performed in response to a single user action.

13. The method of claim 1 wherein the reinitializing the hard bias layer further comprises:

rotating the head gimbal assembly 90 degrees to a second orientation;

re-inserting the head gimbal assembly between the poles of the magnet;

turning the magnet on to reinitialize the hard bias layer of the spin valve sensor;

turning the magnet off; and removing the head gimbal assembly from the magnet poles of the magnet.

14. The method of claim 1 wherein the first assisting magnetic field is 14,000 Oersted.

15. The method of claim 1 wherein the second magnetic field is 14,000 Oersted.

16. A system for performing spin valve combined pinned layer reset and hard bias initialization at the head gimbal assembly level, comprising:

a motion controller for holding and controlling the motion of a head gimbal assembly having a spin valve sensor relative to a magnet; and a processor, coupled to the motion controller and the magnet, the processor controlling the motion controller to position of the head gimbal assembly and controlling the application of a magnetic field of the magnet;

wherein the processor first resets the pinned layer of the spin valve sensor by loading the head gimbal assembly in a first orientation within the poles of the magnet and applying a first assisting magnetic field of the magnet to the spin valve sensor and then reinitializes the hard bias layer of the spin valve sensor by rotating the head gimbal assembly 90 degrees to a second orientation and applying a second magnetic field of the magnet.

17. The system of claim 16 wherein the processor is automated to control the motion controller in response to a single user action.

18. The system of claim 16 further comprising a pulse generator for applying a current pulse to the spin valve sensor when the head gimbal assembly is loaded in the first orientation.

19. The system of claim 18 wherein the processor resets the pinned layer by connecting the spin valve sensor to a pulse generator, positioning the head gimbal assembly in a first orientation within poles of a magnet, applying a current pulse to the spin valve sensor, turning on the magnet to produce a magnetic field for resetting the pinned layer of the spin valve sensor, turning the magnetic field of the magnet off and removing the head gimbal assembly from the magnet.

20. The system of claim 19 wherein the processor reinitializes the hard bias layer by rotating the head gimbal assembly 90 degrees to a second orientation, re-inserting the head gimbal assembly between the poles of the magnet, turning the magnet on to reinitialize the hard bias layer of the spin valve sensor, turning the magnet off and removing the head gimbal assembly from the magnet poles of the magnet.

21. The system of claim 18 wherein the first orientation aligns the pinned layer magnetization with the first assisting magnetic field of the magnet.

22. The system of claim 18 wherein the second orientation aligns the hard bias layer magnetization with the second magnetic field of the magnet.

23. The system of claim 18 wherein the first assisting magnetic field is 6500 Oersted.

24. The system of claim 18 wherein the second magnetic field is 6500 Oersted.

25. The system of claim 18 wherein the pulse generator generates a current pulse having an adjustable current level.

26. The system of claim 18 wherein the processor reinitializes the hard bias layer by rotating the head gimbal assembly 90 degrees to a second orientation, re-inserting the head gimbal assembly between the poles of the magnet, turning the magnet on to reinitialize the hard bias layer of the spin valve sensor, turning the magnet off and removing the head gimbal assembly from the magnet poles of the magnet.

27. The system of claim 18 wherein the processor is automated to control the motion controller in response to a single user action.

28. The system of claim 16 wherein the processor reinitializes the hard bias layer by rotating the head gimbal assembly 90 degrees to a second orientation, re-inserting the head gimbal assembly between the poles of the magnet, turning the magnet on to reinitialize the hard bias layer of the spin valve sensor, turning the magnet off and removing the head gimbal assembly from the magnet poles of the magnet.

29. The system of claim 16 wherein the first assisting magnetic field is 14,000 Oersted.

30. The system of claim 16 wherein the second magnetic field is 14,000 Oersted.

* * * * *

UNITED STATES PATENT AND TRADEMARK OFFICE
CERTIFICATE OF CORRECTION

PATENT NO. : 6,728,055 B1
DATED : April 27 2004
INVENTOR(S) : Gill et al.

It is certified that error appears in the above-identified patent and that said Letters Patent is hereby corrected as shown below:

Column 7,
Line 48, "that's supports" should read -- that supports --.

Column 11,
Line 54, "Oust" should read -- (just --.

Signed and Sealed this

Tenth Day of August, 2004

JON W. DUDAS
*Acting Director of the United States Patent and Trademark Office*